UNITED STATES PATENT OFFICE.

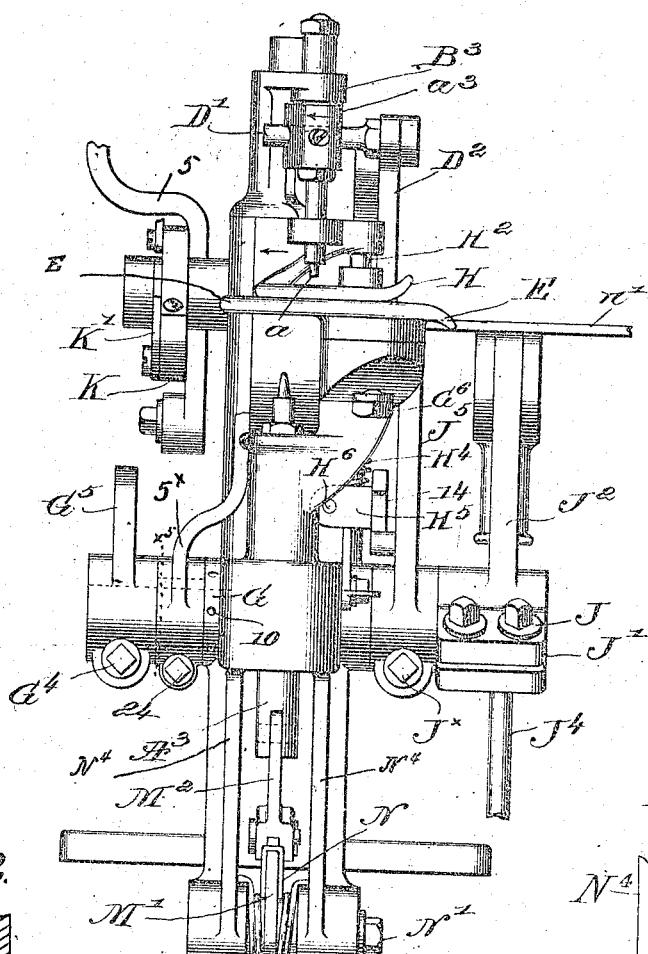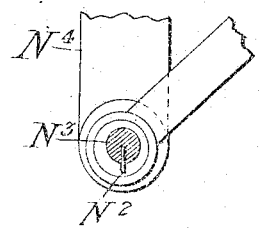

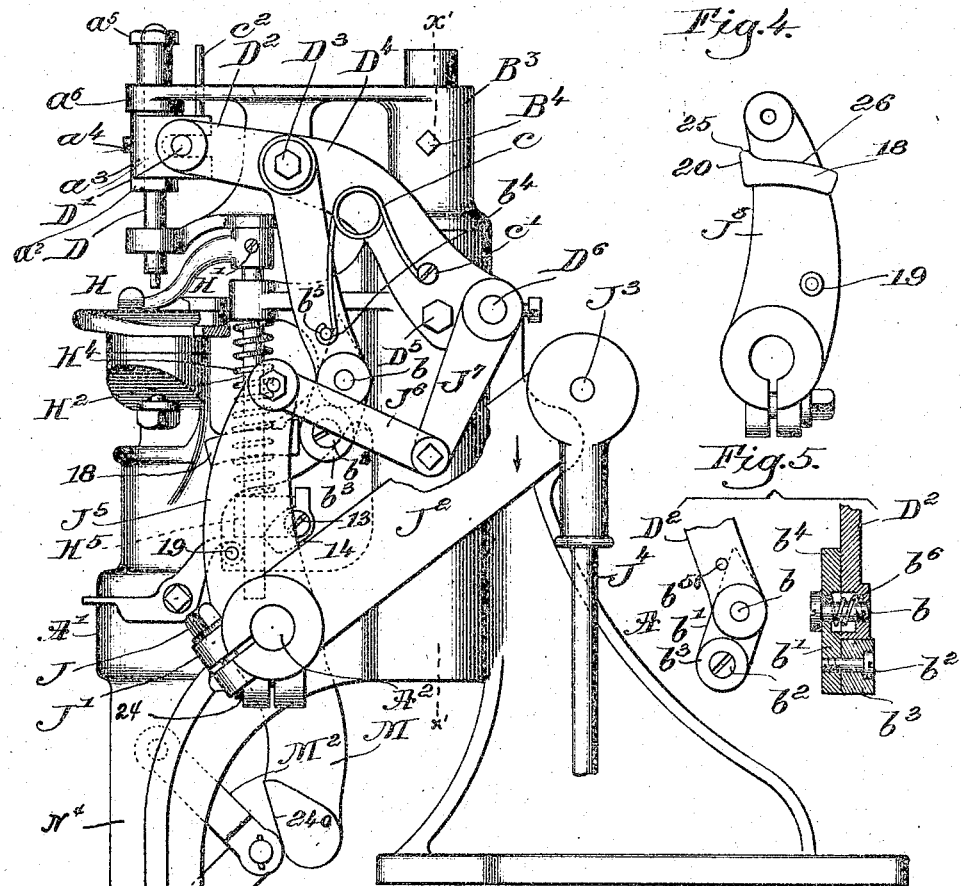

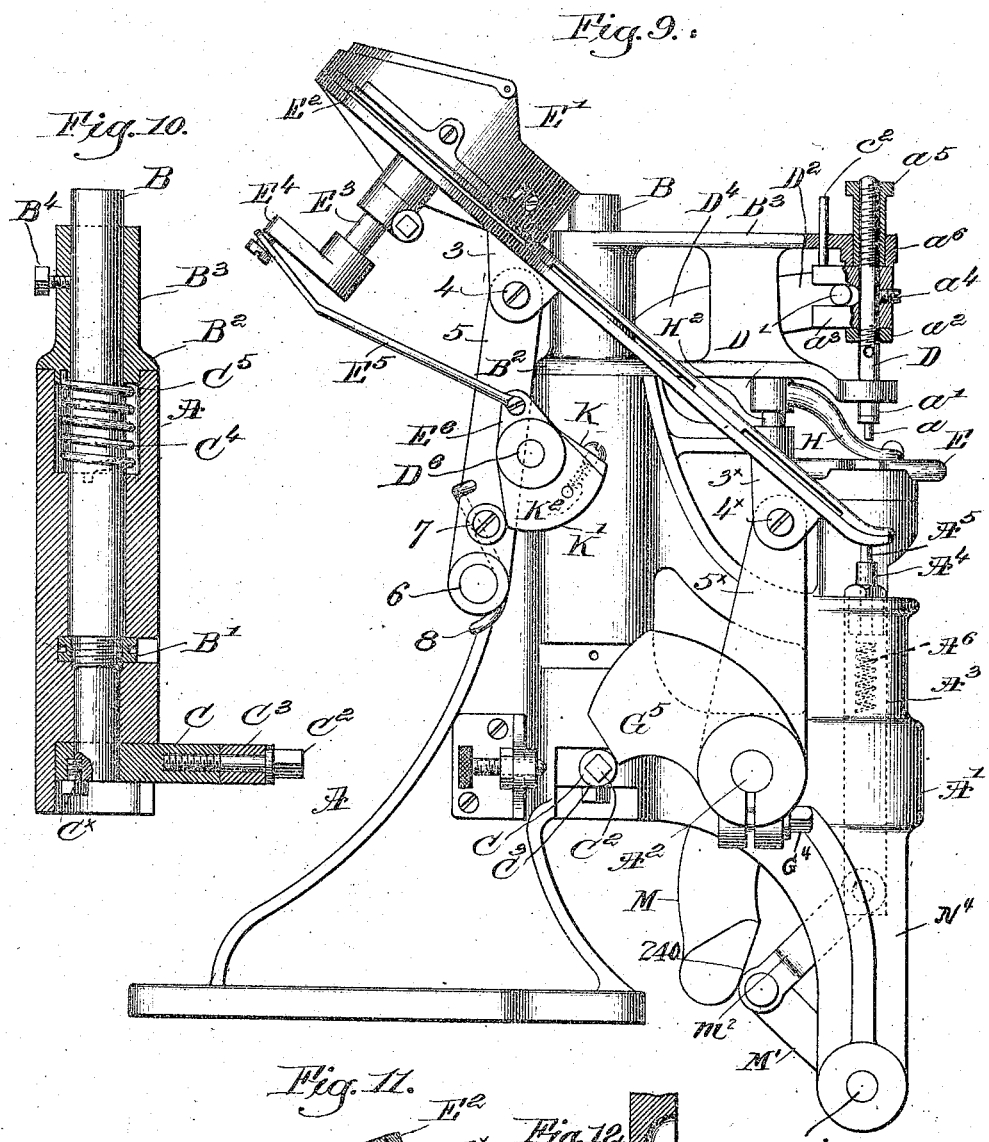

PERLEY R. GLASS, OF QUINCY, AND WILLIAM Z. BEAN, OF WEST MEDFORD, MASSACHUSETTS, ASSIGNORS, BY MESNE ASSIGNMENTS, TO THE PEERLESS MACHINERY COMPANY, A CORPORATION OF MASSACHUSETTS.

EYELETING-MACHINE.

No. 905,124.　　　　Specification of Letters Patent.　　　　Patented Nov. 24, 1908.

Application filed June 14, 1902. Serial No. 111,713.

*To all whom it may concern:*

Be it known that we, PERLEY R. GLASS and WILLIAM Z. BEAN, citizens of the United States, residing, respectively, at Quincy, county of Norfolk, and West Medford, county of Middlesex, and State of Massachusetts, have invented an Improvement in Eyeleting-Machines, of which the following description, in connection with the accompanying drawings, is a specification, like letters on the drawings representing like parts.

This invention has for its object the production of a novel eyeleting machine by which an eyelet may be taken from a raceway and set in stock at each cycle of operations of the machine.

In the machine to be herein described a punch makes a hole in the stock and feeds the latter in position over the ascending plunger and lower set, the eyelet to be set surrounding the plunger.

Figure 1 in front elevation represents a sufficient portion of an eyeleting machine embodying our improvements in one of the best forms now known to us, to enable our invention to be understood; Fig. 1$^a$ is a sectional detail showing the shaft $N^3$ and its eccentric $n^2$; Fig. 2 is a sectional detail in line $x^5$, Fig. 1, showing shaft $A^2$ and its eccentric G; Fig. 3 is a right hand side elevation of the machine shown in Fig. 1; Fig. 4 shows the inner side of arm $J^5$ detached; Fig. 5 shows the lower end of lever $D^2$ and the trip device; Figs. 6 and 7 show part of the shank of the work clamp and its attached block and dog; Fig. 8 shows in section the support for the toggle; Fig. 9 is a left hand side elevation of the machine shown in Fig. 1 partially broken out; Fig. 10 is a partial section in the line $x'$, Fig. 3; Fig. 11 shows part of the lower end of the raceway; Fig. 12 shows the punch and upper set partially in section.

The framework A of the machine adapted to be sustained upon a bench, or in any other usual manner, has extended from it a portion A' suitably bored to constitute a bearing for the shaft $A^2$, and a guide for the bar $A^3$ carrying the under set $A^4$ containing a freely movable plunger $A^5$ sustained by a spring $A^6$ in usual manner.

The frame A is suitably bored to receive a vertical rock shaft B carrying near its lower end, see Figs. 9 and 10, an adjustable collar B' the upper face of which, by abutting the framework, prevents the undue rising of the said rock-shaft, and keeps the flange $B^2$ of a head $B^3$, secured to said rock shaft by a set screw $B^4$, seated on the upper end of the framework.

The lower end of the rock shaft B has secured to it by a suitable set screw $C^x$ or otherwise, a collar C having a stud $C^2$ surrounded by a roller $C^3$. The rock shaft B is surrounded by a spring $C^4$ the lower end of which is fixed to the framework, while the upper end thereof enters a boss $C^5$ depending from the head $B^3$, said spring acting normally to hold the head in position for the proper action of the bar D carrying the punch to be described, that the latter when operated may punch the stock.

The outer end of the head $B^3$ is bored to receive the bar D provided at its lower end with a combined punch and upper set, said punch and upper set being represented as detachable from the bar. Fig. 12 shows part of the bar and the punch and upper set in section and enlarged, and in said figure, $a$ represents the punch, and $a'$ the shoulder or surface that acts as the upper set.

The bar D is threaded externally, see Fig. 9, and receives a nut $a^2$ the top of which abuts the lower end of a slotted sleeve $a^3$ secured to said bar by a set screw $a^4$. The threaded upper end of the bar receives a nut $a^5$ represented as having a tubular lower end that enters the bearing $a^6$ at the end of the head $B^3$. The sleeve $a^3$ is slotted as shown at its rear side, and receives a stud D' carried by a punch lever $D^2$ having its fulcrum at $D^3$, see Fig. 3, on an arm $D^4$ independent of the head $B^3$, said arm forming part of the framework. This arm is shown as fixed to said framework by a bolt $D^5$, and a hole in the end of said arm surrounds loosely a rock shaft $D^6$ to be described.

The lower end of the punch lever $D^2$ is extended downwardly, and has pivoted upon it at $b$ a trip device $b'$, shown partially by dotted lines Fig. 3 and detached in Fig. 5, said trip device at its lower end carrying a stud $b^2$ provided with a roller $b^3$. The upper end $b^4$ of the trip device $b'$ is maintained in its normal or inoperative position in contact with a stud $b^{50}$ of lever $D^2$ by a spring $b^6$. A spring $c$ connected at one end with the arm $D^4$ by a stud $c'$ and engaging by its opposite end a stud $b^5$ of lever $D^2$ acts to turn the lever $D^2$ in a direction to maintain the punch and top set in their elevated inoperative position. To restrain the rotation of the sleeve $a^3$ in the head $B^3$, a stud $c^2$ connected with said sleeve enters and is free to slide through a suitable hole in the head $B^3$. By turning the nuts $a^5$ and $a^2$ the bar D may be raised or lowered to afford exactly the proper position for the punch in its descent that it may cut through the material sustained on the work support E.

The eyelets to be used will be deposited in an eyelet box $E'$ sustained in usual manner at the upper end of the raceway $E^2$. The eyelets in the box may be kept properly agitated by means of a plate having brushes of usual construction carried by the shaft $E^3$ having its bearing in a hub of the plate $E^2$, the lower end of said shaft having attached to it a crank arm $E^4$ with which is attached a link $E^5$ connected in turn at its opposite end with an arm $E^6$ extended from the rock shaft $D^6$.

The eyelets pass from the hopper $E'$ down the usual raceway composed of bars $E^x$ attached to the raceway plate $E^2$ by suitable screws 2, and in practice there is a row of eyelets between the lower extremity of the raceway and the hopper, and the lowermost eyelet $a^x$ of the row and those back of it are retained in the raceway by means of a spring controlled dog $d$, see Fig. 11.

The raceway plate $E^2$ has suitable ears 3, $3^x$, to which are jointed by stud screws or pins 4, $4^x$, raceway sustaining means represented as radius bars 5, $5^x$. The radius bar 5 is mounted on a stud 6, and said bar has a roller or other stud 7, and a spiral spring 8, represented as surrounding the stud 6 and acting against the radius bar 5 serves normally to keep the roller stud pressed toward a cam to be described that in its action moves the raceway backwardly from the path of movement of the plunger $A^5$ after said plunger has entered an endmost eyelet of the raceway.

The lower end of the radius bar $5^x$ has a split hub that embraces an eccentric bushing G which is clamped in said hub by a screw 24, said bushing G surrounding said shaft. This bushing, shown by dotted lines Fig. 1 and in section Fig. 2 has a series of holes 10 to be engaged by a suitable tool when the screw is slackened, the turning of said bushing in said bar insuring the proper position for the lower end of the raceway with relation to the plunger that is to enter the eyelets.

The shaft $A^2$ has clamped firmly upon its outer end by a clamp screw $G^4$ a cam or actuator $G^5$ that in the movements of the rock shaft $A^2$ by the operator causes said cam to act against the roller $C^3$ of the stud C and swing the head $B^3$ in the direction of the arrow Fig. 1, so that when the punch $a$ is yet in the stock, it having punched a hole therein, the head $B^3$ may be swung to feed the stock into proper position above the plunger, as will be described, to enable an eyelet to be set.

The stock into which the eyelets are set will be sustained on a work support E of usual construction secured to the framework by a suitable bolt $G^6$.

The stock to be punched preparatory to receiving an eyelet, is acted upon by a suitable clamping presser foot H connected by a set screw $H'$ with the upper end of a rod $H^2$ guided in suitable bearings of the framework. Said rod is surrounded by a spiral spring $H^4$ that acts normally to keep the presser foot down upon the face of the stock, the lower end of said spring being sustained by a collar $H^5$ secured to said rod by a suitable clamp screw $H^6$, see Fig. 1. The collar $H^5$ has a stud 13, see Figs. 3 and 6, upon which is pivoted a dog 14 controlled by a spring 15, said spring acting normally to keep a projection 16 at the upper end of said dog yieldingly in contact with said collar $H^5$. The shaft $A^2$ has clamped upon it at one end by clamp screws J the split hub $J'$ of a lever $J^2$ provided at its upper end with a suitable stud $J^3$ that is embraced by the bifurcated upper end of a rod $J^4$ extended downwardly and connected with a suitable treadle, not shown, under the control of the operator, so that when said treadle is depressed by the operator the lever $J^2$ will be moved in the direction of the arrow on it in Fig. 3, a suitable spring, not shown, connected with the treadle and with the rod near its lower end, acting normally to maintain in the lever $J^2$ in the full line position Fig. 3. The rock shaft $A^2$ has clamped to it by a screw $J^x$ the split hub of an arm $J^5$, that has jointed to it by a suitable stud a link $J^6$ in turn jointed at its opposite end to an arm $J^7$ depending from the rock shaft $D^6$, so that the movement of the rock shaft $A^2$ moves the shaft $D^6$ through the devices described.

The shaft $D^6$ is provided at its opposite end, see Fig. 9, with a main cam K fast thereon, and at the outer side of said cam said shaft is provided with an auxiliary cam or retarding device $K'$ which is loose on said shaft, said auxiliary cam being acted upon by a spring $K^2$ represented as interposed between said cams K and $K'$ so that said spring acts normally to keep the auxiliary cam $K'$ in such position with relation to the roller 7 that when the rock shaft $D^6$ is turned to cause the cam K to move the raceway backwardly, the plunger having risen within the endmost eyelet, the retarding device or cam $K'$ will first contact with the roll 7, but the spring K² will enable said cam to yield so that the arm 5 will not be moved until the main cam K meets the roller 7 and causes the movement of the raceway backwardly in order that the eyelet on the end of the raceway and at that time entered by the plunger may be automatically picked off and left on the plunger.

The raceway after the setting operation has been completed and the under set and plunger have been retracted into their normal inoperative position, must resume its operative position to thereby present the endmost eyelet to the rising plunger at the next cycle of tion of the machine.

By the use of only the cam K, the raceway will come back into its operative position before the plunger and under set arrive in their normal inoperative position, and would meet the plunger to its injury, but by the employment of the retarding device or cam it has been found that the cam K may be started backwardly from contact with the roller stud 7, but the raceway will not be moved forwardly by the spring 8 until after the spring controlled retarding device or cam K' retires from its contact with the stud.

The arm J⁵ has connected to it at its inner side, see Fig. 4, a cam block 18, and said arm also has a roller stud 19.

When the arm J² is depressed as described and the arm J⁵ is moved to the right, Fig. 3, the end 20 of the cam block 18 meets the roller stud b³ at the lower end of the trip device b', and the upper end thereof being then in contact with the stud b⁵, the lever D² is turned to depress the bar carrying the punch and the upper set, causing the punch to meet the face of the stock and punch a hole therein.

Just as the punch is completing its down stroke the roller stud 19 meets the end of the dog 14 pivoted on the block H⁵ and acting on said dog starts upwardly the rod H² and stock clamp or presser foot H to relieve the pressure on the stock that it may be fed while the punch is yet in the stock.

In the further movement of the arm J⁵ after releasing the stock clamp, the link J⁶ turns the rock shaft D⁶ and brings the edge of the retarding device K' in contact with the roller stud 7, and the inclined face 240 of a downwardly projecting arm M connected with the rock shaft A² meets the jointed part of a toggle lever M', M², and starts upwardly the bar carrying the under set and plunger. This plunger enters the endmost eyelet on the raceway, and during this time the retarding device or cam yields under the action of its spring until the edge thereof in contact with roller 7 comes into alinement with the rear edge of the main cam K. In the meantime the roller stud b³ has arrived upon and passed over the projection 25 of the cam 18, which permits the spring c to act and turn the lever D² sufficiently to withdraw the lower end of the punch from contact with the stock support, but leaving the punch in the stock. As the cam G⁵ meets the roller C³ it starts the rock shaft B and head B³, causing said head to be swung laterally while the punch is in the stock but lifted from contact with the stock support, so that the punch may feed the stock over the stock support and place the punched hole in line with the plunger, and at the same instant the cam K acts to move the raceway away from the plunger.

As the plunger and lower set rise, the plunger surrounded by the eyelet enters first the hole in the punched stock, and then the hole in the end of the punch, and while the plunger is arrested in its upward position the under set rises, forces the eyelet off the plunger through the hole in the stock, the eyelet passes over the outside of the punch, and the small end of the eyelet meets the shoulder a' constituting the upper set, and the final upward movement of the under set sets the eyelet in the stock.

Just about as the setting operation is completed the roller stud b³ leaves entirely the cam 18, thus letting the spring c act quickly to fully withdraw the punch from the stock and return the punch into its normal inoperative position, and at the same time the roller stud 19 passes beyond the dog 14, letting the spring H⁴ depress the stock clamp or presser foot onto the stock.

When the arm J² has been fully depressed by the operator, the punch will have returned to its inoperative position, the stock clamp or presser foot will clamp the stock on the stock support, and the plunger and under set will occupy their highest positions, and an eyelet will have been set.

As the arm J² is raised from its depressed position after the operator removes his foot from the treadle referred to, the rock shaft D⁶ and cam K are started backwardly, and the rock shaft A² is turned, causing the arm M to retire from the toggle joint, enabling the spring N surrounding the fulcrum sustaining the lowermost link M' of the toggle to act and break the toggle and start downwardly the lower set and plunger. About as the lower set is arriving in its lowermost position the cam K, if acting alone, would let the raceway move forwardly under the action of spring 8, but owing to the retarding device or auxiliary cam that acts after the main cam K retires from the roller stud 7, the forward movement of the raceway is retarded until such time as the bottom set and plunger have arrived in their extreme lowermost position, so that the end of the raceway is prevented from striking the bottom set or the plunger, and injuring the same.

During the rising movement of the arm J² the cam G⁵ is also raised so that just as the raceway comes forward into its operative position, the spring C⁴ surrounding the shaft B acts to return the head B³ and the punch and upper set into such position that the punch may be again actuated, and the cam 18 in the further movement of the rock shaft A² acting on the roller stud b³ of the trip device moves the same about its stud b without at all affecting the movement of the lever D², and finally the end 20 of said cam passes said roller stud, permitting the spring b⁶ coacting with said trip device to turn said device into its operative position represented in Fig. 3. At the same time the roller stud 19 carried by the arm J⁵ passes the dog 14 without at all affecting the position of the presser foot, and said stud stops in a position represented in Fig. 3, ready to again meet the dog 14 and lift the presser foot whenever the arm J² is depressed.

The work-support may be provided with a suitable gage of ordinary form which forms no part of the present invention and hence is unnecessary to illustrate.

The lower arm M' of the toggle, see Fig. 8, embraces an eccentric N² suitably keyed or secured to the stud N³ held in depending ears N⁴ of the framework by a suitable set screw N⁵. One end of the stud N³ is suitably shaped to be engaged by a key that the stud may be turned to adjust the eccentric and thereby raise or lower the support for the lower member of the toggle. This adjustment enables the upward movement of the under set and of the plunger sustained thereby to be exactly regulated so that said plunger and under set may coact properly with the punch and upper set.

From the foregoing it will be seen that the operator by one movement of the treadle, a manually controlled device, is enabled to clamp the stock on the stock support, punch a hole in the clamped stock, release the clamped stock, feed the same, move a plunger to enter an eyelet at the end of a raceway, move the raceway to detach the eyelet and leave it on the plunger, and then further move the under set to force the eyelet from the plunger into the stock, and set the eyelet by upsetting the same in the stock, the parts actuated to do these things being thereafter returned automatically into their starting position.

We also believe that we are the first to move a raceway backwardly by means that act together when moving the raceway away from the plunger, and that act in succession, or one after the other, or independently, when the raceway is to be returned to the plunger.

Having described our invention, what we claim and desire to secure by Letters Patent is:—

1. In an eyeleting machine, a raceway to sustain eyelets, a hollow punch having a shoulder to act as a top-set, a bar having a shoulder to act as an under-set, a plunger carried by the under-set to enter the endmost eyelet of said raceway, and guide-ways for said bars, and two links jointed to form a toggle, one of said links being jointed to said underset, the other of said links having a hollow hub to embrace an eccentric; combined with said eccentric and a stud carrying the same, the turning of said eccentric in said link controlling the extent of movement of said under-set with relation to the said top-set and punch in setting an eyelet in the stock.

2. In an eyeleting machine, a work support, a combined punch and top-set, a lever connected therewith and provided at its lower end with a trip device, a lever-moving spring acting normally to turn said lever and raise said combined punch and top-set, a trip actuating device, and manually controlled means to operate said device and cause it to act during the first part of its stroke on said trip device to turn said lever and depress the combined punch and top-set to the full limits of its stroke, said means in its further movement permitting the lever moving spring to slightly raise the combined punch and top-set maintaining said punch in the stock, and means for moving the combined punch and top-set laterally to feed the stock.

3. In an eyeleting machine, a work-support, a presser-foot, a spring to depress the same, a dog connected with the presser-foot, combined with manually-controlled means having a stud to meet said dog and raise said presser-foot against its spring.

4. In an eyeleting machine, a combined punch and top-set, a connected lever, a lever-moving spring acting at one end against said lever to maintain the punch and top-set in its elevated position, a trip device pivoted at the lower end of said lever, a trip actuating device, manually controlled means for operating said trip actuating device, said manually-controlled device acting on said trip device to move said lever and cause the punch to meet and punch the stock and compress said lever-moving spring, the latter acting normally to slightly raise said punch as the manually-controlled device passes said trip device.

5. In an eyeleting machine, a combined punch and top-set, a connected lever having a stud, a lever-moving spring acting normally to turn said lever to raise said punch, a trip device pivoted on said lever and provided with a roller, a trip spring co-acting normally with said trip device to maintain one end thereof against said stud, and a manually controlled device having a block to act on said trip device and turn said lever to depress the combined punch and top-set and compress said lever-moving spring, the latter thereafter serving to raise the combined punch and top-set when said block retires from contact with said trip device.

6. In an eyeleting machine, a raceway, a pivoted arm sustaining said raceway and provided with a stud, an under-set and plunger, means to raise said set and plunger that the latter may enter the endmost eyelet in said raceway, a shaft having a main and an auxiliary cam, the said auxiliary cam being sustained yieldingly at one side of said main cam, a spring co-acting with said arm to retain said stud pressed normally towards said cams, means to move said shaft that said cams acting on said stud may move the raceway away from the plunger and leave thereon an eyelet, said auxiliary cam, when it and said main cam are moved in the opposite direction, permitting the spring co-acting with the arm carrying said stud to move the raceway into position that an eyelet carried thereon may be entered by said plunger, only after the main cam retires from said stud, said auxiliary cam thereby retarding the movement of the delivery end of the raceway into the path of said plunger.

7. In a machine of the class described, a raceway, pivoted arms sustaining said raceway, a stud on one of said arms, a plunger to enter the eyelet at the end of said raceway, a main cam, a coacting retarding device connected loosely with said main cam, a spring acting normally to maintain said stud in contact with said cam and retarding device to hold said raceway in its forward position in the path of said plunger, means to actuate said cam and retarding device to contact with said stud and cause the free end of said raceway to move backwardly away from the path of movement of said plunger, said actuating means operating to cause said retarding device to retire from contact with said stud, only after said main cam retires from contact therewith.

8. In an eyeleting machine, a work-support, a hollow punch, means to move said punch to punch a hole in stock on said stock-support, means for moving said punch laterally to feed the stock over the work-support, and a presser-foot, its depressing spring and a dog; combined with means acting on said dog while the punch is in the stock and is about to be moved laterally to lift said presser-foot to release the stock that the punch may feed the stock over the stock support.

9. In an eyeleting machine, a stock-support, a lever, a combined punch and top-set, means to move said lever to cause the punch and top-set to descend and punch the stock, means to move the punch laterally to feed the stock, a bottom-set to rise and co-act with the top-set to set an eyelet in the stock, and a spring connected with said lever to raise said punch and top-set into its starting position immediately after both sets have acted to set an eyelet and prior to returning the punch into its starting position to again engage the stock to feed the same.

In testimony whereof, we have signed our names to this specification, in the presence of two subscribing witnesses.

PERLEY R. GLASS.
WILLIAM Z. BEAN.

Witnesses:
GEO. W. GREGORY,
EDITH M. STODDARD.